(No Model.)

M. J. CUSHMAN.
APPARATUS FOR TESTING MILK.

No. 478,737. Patented July 12, 1892.

WITNESSES
Thomas J. Routt Jr.
Chapman W. Fowler

INVENTOR
Modestus J. Cushman
by A. H. Evans & Co. Attorneys

THE NORRIS PETERS CO., PHOTO-LITHO., WASHINGTON, D. C.

UNITED STATES PATENT OFFICE.

MODESTUS J. CUSHMAN, OF WATERLOO, IOWA.

APPARATUS FOR TESTING MILK.

SPECIFICATION forming part of Letters Patent No. 478,737, dated July 12, 1892.

Application filed February 18, 1892. Serial No. 421,954. (No model.)

*To all whom it may concern:*

Be it known that I, MODESTUS J. CUSHMAN, a citizen of the United States, residing at Waterloo, in the county of Black Hawk and State of Iowa, have invented certain new and useful Improvements in Apparatus for Testing Milk, as set forth in the accompanying drawings, forming part of this specification, in which—

Figure 1:
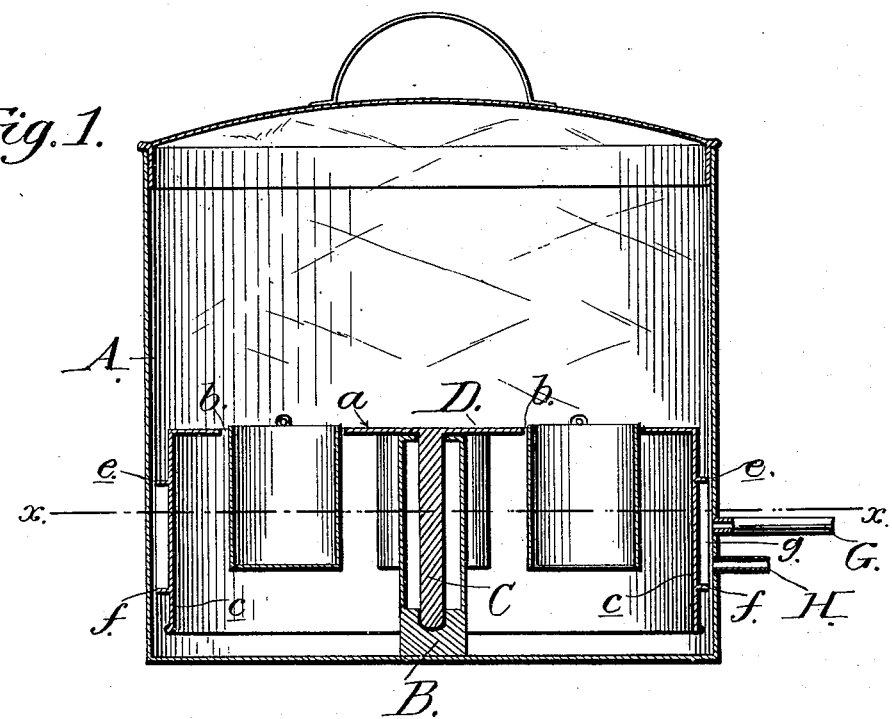
Figure 2:
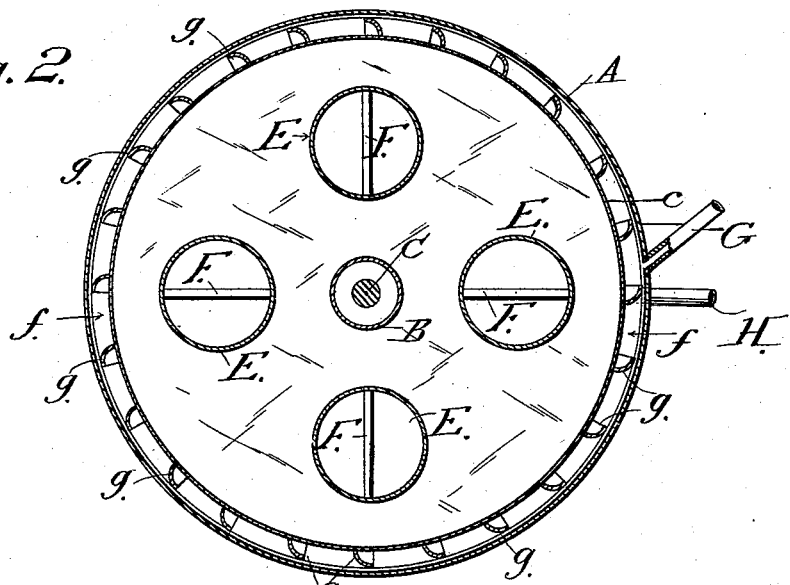

Figure 1 is a vertical sectional view of my improved milk-testing apparatus. Fig. 2 is a horizontal sectional view of the same on the line $x$ $x$ of Fig. 1.

My invention relates to apparatus to be used in creameries and cheese-factories and for domestic purposes for testing the amount of butter-fat contained in the milk and for determining the quality of milk given by the cows; and my invention consists in the constructions and combinations of devices, which I shall hereinafter fully describe and claim.

To enable others skilled in the art to which my invention appertains to make and use the same, I will now describe its construction and indicate the manner in which the same is carried out.

In the said drawings, A represents the case or outer vessel of the testing apparatus, which is adapted to be supported upon a frame or table in the manner common to this class of machines. From the center of the bottom of this casing rises a post B, having a vertical bore or opening adapted to receive a vertical shaft C on the rotatable vessel D, whereby the post forms a long bearing, in which said shaft is seated and rotates. The rotatable vessel D has a diameter about equal to the inner diameter of the encircling case or cylinder A, and it consists of a top $a$, provided with a series of openings $b$, and a deep vertical flange $c$, extending down along the inner sides of the case of cylinder, thereby forming an air-chamber beneath the top of the inner vessel. Within the opening $b$ of the inner vessel the receptacles E are pivotally hung, so that they may have a swinging movement to enable them to be maintained in a a vertical position at all times, and the bottoms of the receptacles are partially closed by strips or plates F, upon which the bottles or milk-containing receptacles are supported. The depending flange $c$ of the inner vessel is formed substantially as a turbine wheel, it having the horizontally-extending upper and lower flanges $e$ and $f$ and the intermediate spaced and curved flanges $g$, forming the buckets of the wheel. The flanges $e$ and $f$ extend nearly or quite to the inner wall of the exterior case or cylinder and with said wall practically form an inclosing chamber of the space in which the buckets are arranged, and through the side of the exterior case or cylinder a pipe G enters at an angle and has its inner end arranged in line with the middle portions of the buckets on the inner vessel. This pipe G connects with any suitable source of steam-supply, (not shown,) whereby a jet of steam may be projected into the space between the flanges $e$ and $f$ of the inner vessel and impinging upon the curved faces of the flanges or buckets at an angle imparts to the inner vessel a continuous and uniform rotary movement. A second pipe H, leading outward through the sides of the outer vessel, serves as an exhaust, while, if desired, a draw-off cock may be let into the lower part of the exterior vessel to draw off the water of condensation. From this description it will be seen that by using the steam in the manner stated I am enabled to obtain the uniform and continuous rotary movement so essential in this class of machines and also am enabled to utilize the heat from this steam for raising the temperature of the milk contained in the bottles or receptacles carried by the inner revolving vessel.

Having thus described my invention, what I claim as new, and desire to secure by Letters Patent, is—

1. In milk-testing apparatus, the inclosing case or exterior vessel having the steam and exhaust pipes, in combination with an inner vessel adapted to support the milk-receptacles and to rotate within the outer vessel, said inner vessel having a vertical surrounding flange provided with upper and lower horizontal flanges and connecting curved blades or buckets forming a turbine wheel, into which the steam-pipe discharges to rotate the inner vessel and raise the temperature of the milk, substantially as herein described.

2. In milk-testing apparatus, the outer vessel or case having the steam and exhaust pipes and the vertically-disposed post, an inner vessel having a shaft mounted in said post and having swinging milk-receptacles supported in openings in its top, said inner vessel having a deep surrounding vertical flange, the upper and lower flanges e and f, extending horizontally from the vertical flange and forming with the same and the inner wall of the outer vessel an inclosed chamber, and the curved vertical blades or buckets between the flanges e and f and adapted to receive the discharge of the steam-pipe, whereby the inner vessel is rotated and the temperature of the milk raised, substantially as herein described.

MODESTUS J. CUSHMAN.

Witnesses:
D. L. WOOD,
N. E. BRIGGS.